(12) United States Patent
Kubota et al.

(10) Patent No.: US 11,600,824 B2
(45) Date of Patent: Mar. 7, 2023

(54) CONDUCTIVE CARBON MIXTURE AND METHOD FOR MANUFACTURING SAME, ELECTRODE USING CONDUCTIVE CARBON MIXTURE AND METHOD FOR MANUFACTURING SAME, AND ELECTRICITY STORAGE DEVICE PROVIDED WITH ELECTRODE

(71) Applicant: NIPPON CHEMI-CON CORPORATION, Tokyo (JP)

(72) Inventors: Satoshi Kubota, Tokyo (JP); Yasuyoshi Shiraishi, Tokyo (JP); Noriyuki Miyamoto, Tokyo (JP); Masaki Koike, Tokyo (JP); Shuichi Ishimoto, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 378 days.

(21) Appl. No.: 16/630,290

(22) PCT Filed: Jul. 3, 2018

(86) PCT No.: PCT/JP2018/025128
§ 371 (c)(1),
(2) Date: Jan. 10, 2020

(87) PCT Pub. No.: WO2019/013034
PCT Pub. Date: Jan. 17, 2019

(65) Prior Publication Data
US 2020/0168912 A1    May 28, 2020

(30) Foreign Application Priority Data
Jul. 12, 2017    (JP) .............................. JP2017-136475

(51) Int. Cl.
*H01M 4/62* (2006.01)
*C09C 1/54* (2006.01)
(Continued)

(52) U.S. Cl.
CPC ............... *H01M 4/625* (2013.01); *C09C 1/54* (2013.01); *C09C 1/565* (2013.01); *H01B 1/04* (2013.01);
(Continued)

(58) Field of Classification Search
CPC .... H01M 4/043; H01M 4/0404; H01M 4/625; H01M 2004/021; C01P 2002/82; C09C 1/565
See application file for complete search history.

(56) References Cited

U.S. PATENT DOCUMENTS

| 2015/0207144 A1 | 7/2015 | Naoi et al. |
| 2017/0077519 A1 | 3/2017 | Kubota et al. |
| 2017/0221644 A1 | 8/2017 | Kubota et al. |

FOREIGN PATENT DOCUMENTS

| JP | 2013-77426 A | 4/2013 |
| JP | 2014-72090 A | 4/2014 |

(Continued)

OTHER PUBLICATIONS

English translation of JP Publication 2016-096125, May 2016.*
(Continued)

*Primary Examiner* — Brittany L Raymond
(74) *Attorney, Agent, or Firm* — Birch, Stewart, Kolasch & Birch, LLP (57) ABSTRACT

Provided is a conductive carbon mixture which is to be used together with an electrode active material in manufacturing an electrode of an electricity storage device and enables the manufacture of the electricity storage device having a good cycle life. The conductive carbon mixture for manufacturing (Continued)

an electrode of an electricity storage device comprises an oxidized carbon having electrical conductivity and a different conductive carbon which is different from the oxidized carbon, wherein the oxidized carbon covers the surface of the different conductive carbon. The conductive carbon mixture is characterized in that the ratio of the peak intensity of the 2D band to the peak intensity of the D band in a Raman spectrum of the conductive carbon mixture is 55% or less relative to the ratio of the peak intensity of the 2D band to the peak intensity of the D band in a Raman spectrum of the different conductive carbon. This conductive carbon mixture covers the surface of the electrode active material in a particularly good manner and thus prolongs the cycle life of the electricity storage device.

10 Claims, 1 Drawing Sheet

(51) Int. Cl.
  *C09C 1/56* (2006.01)
  *H01G 11/32* (2013.01)
  *H01G 11/86* (2013.01)
  *H01M 4/04* (2006.01)
  *H01B 1/04* (2006.01)
  *H01M 4/02* (2006.01)

(52) U.S. Cl.
  CPC ............ *H01G 11/32* (2013.01); *H01G 11/86* (2013.01); *H01M 4/0402* (2013.01); *H01M 4/043* (2013.01); *C01P 2002/82* (2013.01); *C01P 2006/40* (2013.01); *H01M 4/0404* (2013.01); *H01M 2004/021* (2013.01)

(56) References Cited

FOREIGN PATENT DOCUMENTS

| | | | |
|---|---|---|---|
| JP | 2016-096125 | * | 5/2016 |
| JP | 2016-96125 A | | 5/2016 |
| WO | WO 2015/133586 A1 | | 9/2015 |

OTHER PUBLICATIONS

International Search Report issued in PCT/JP2018/025128 (PCT/ISA/210), dated Oct. 2, 2018.
Written Opinion of the International Searching Authority issued in PCT/JP2018/025128 (PCT/ISA/237), dated Oct. 2, 2018.

* cited by examiner

CONDUCTIVE CARBON MIXTURE AND METHOD FOR MANUFACTURING SAME, ELECTRODE USING CONDUCTIVE CARBON MIXTURE AND METHOD FOR MANUFACTURING SAME, AND ELECTRICITY STORAGE DEVICE PROVIDED WITH ELECTRODE

TECHNICAL FIELD

The present invention relates to a conductive carbon mixture to be used in manufacturing an electrode of an electricity storage device and a method for manufacturing the same. The present invention also relates to an electrode using the conductive carbon mixture and a method of manufacturing the same, and an electricity storage device provided with the electrode.

THE RELATED ART

Electricity storage devices such as secondary batteries, electric double layer capacitor, redox capacitors and hybrid capacitors are considered to be utilized for wide applications, for example, batteries for information devices such as cellphones and laptop computers, motor-driven batteries for low-emission vehicles including electric vehicles and hybrid vehicles, and energy regeneration systems, and improvement of energy density and cycle life in these electricity storage devices has been expected to meet the requirements for enhanced performance and downsizing.

In these electricity storage devices, electrode active materials which express a capacity by a faradic reaction accompanied with the transfer of electrons with ions in an electrolyte (including an electrolytic solution) or by a non-faradic reaction without the transfer of electrons are used for energy storage. These electrode active materials are generally used in the form of a composite material with a conductive agent. Conductive carbons including carbon black, natural graphite, artificial graphite or carbon nanotube, etc., are generally used as a conductive agent. These conductive carbons are used in combination with a low-conductive active material to play a role of adding conductivity to the composite material, and what is more, act as a matrix to absorb the volume change accompanied with a reaction of the active material, and also play a role to secure an electron conduction path even when the active material is mechanically damaged.

The composite materials having an active material and conductive carbon is generally produced by mixing the active material particles and the conductive carbon particles. The conductive carbon essentially does not contribute to the improvement of the energy density of an electricity storage device, so in order to obtain an electricity storage device with a high energy density, it is necessary to increase the amount of active material by reducing the amount of conductive carbon per unit volume. However, there has been a problem that it is difficult to efficiently introduce the conductive carbon particles between the active material particles, and it is therefore difficult to increase the active material amount per unit volume by bringing the distance between the active material particles closer.

In response to this problem, the applicant has proposed a conductive carbon mixture for the manufacture of an electrode of an electricity storage device in Patent Document 1 (JP 2016-96125 A). This conductive carbon mixture is obtained by dry mixing of an oxidized carbon obtained by applying a strong oxidizing treatment to a carbon raw material with an inner vacancy and a different conductive carbon that is different from the oxidized carbon. The oxidized carbon subjected to the strong oxidizing treatment possesses a property that at least a part thereof is deformed into a paste-like state when it is subjected to pressure. The deformation of the oxidized carbon into a paste-like state progresses due to the pressure applied on the oxidized carbon in the dry mixing process, and the oxidized carbon having at least a part deformed into a paste-like state adheres to a surface of the different conductive carbon.

The conductive carbon mixture is well compatible with an electrode active material, and in a process of mixing this conductive carbon mixture and an electrode active material to produce an electrode material for an electricity storage device, a surface of the electrode active material is covered with the oxidized carbon having at least a part deformed into a paste-like state in the conductive carbon mixture. Then, when an active material layer is formed on a current collector by using this electrode material and pressure is applied to the active material layer to manufacture an electrode, the deformation of the oxidized carbon into a paste-like state further progresses due to the pressure, the surface of the electrode active material is further covered with the oxidized carbon deformed into a paste-like state, and both of the oxidized carbon deformed into a paste-like state and the different conductive carbon covered with the oxidized carbon are extruded and densified between particles of the electrode active material close to each other. As a result, the content of the electrode active material in the active material layer can be increased, and an electrode having a high electrode density can be obtained. It has also been found that when an electricity storage device is constructed using the electrode obtained, the conductive carbon mixture suppresses dissolution of the electrode active material into an electrolytic solution in the electricity storage device, even though impregnation of the electrolytic solution into the electrode is not suppressed. Therefore, the conductive carbon mixture provides improved energy density and cycle life of the electricity storage device.

PRIOR ARTS DOCUMENTS

Patent Documents

Patent Document 1: JP 2016-96125 A

SUMMARY OF THE INVENTION

Problems to be Solved by the Invention

A further increase in cycle life is always required for an electricity storage device. Accordingly, the objective of the present invention is to provide a conductive carbon mixture which further prolongs the cycle life of an electricity storage device based on the knowledge of Patent Document 1.

Means for Solving Problems

When the strength of the dry mixing of the oxidized carbon and the different conductive carbon is varied widely to obtain a conductive carbon mixture and the resultant mixture is examined with a laser Raman spectrophotometer, the inventors have found that a ratio of the peak intensity of the 2D band to the peak intensity of the D band in a Raman spectrum of the conductive carbon mixture decreases as the dry mixing intensity increases. The D band is a Raman band derived from edge-oxidized disordered graphite, and the 2D band is its harmonic mode. The ratio of the peak intensity of the 2D band to the peak intensity of the D band in a Raman spectrum is hereinafter referred to as "$R_{2D/D}$". Also in the present invention, the term "oxidized carbon" means carbon which is obtained by applying a strong oxidizing treatment to a carbon raw material having conductivity and has a property that at least a part of the carbon is deformed into a paste-like state when pressure is applied, and the term "paste-like state" means a state wherein grain boundaries of carbon primary particles are not recognized and non-particulate amorphous carbon is connected in a SEM image taken at 25,000× magnification. As a result of intensive examination, the inventors have found that cycle life of an electricity storage device can be remarkably improved when the electricity storage device is constituted by using the conductive carbon mixture having a value of $R_{2D/D}$ in the Raman spectrum that is 55% or less, preferably 20 to 55%, and particularly preferably 20 to 35%, of the $R_{2D/D}$ in the Raman spectrum of the different conductive carbon, and completed the invention.

Thus, the present invention first relates to a conductive carbon mixture for the manufacture of an electrode of an electrical storage device comprising: an oxidized carbon having conductivity; and a different conductive carbon which is different from the oxidized carbon, the oxidized carbon covering a surface of the different conductive carbon, wherein the $R_{2D/D}$ in a Raman spectrum of the conductive carbon mixture is 55% or less, preferably 20 to 55%, especially preferably 20 to 35% of the $R_{2D/D}$ in a Raman spectrum of the different conductive carbon. The present invention also relates to a method of producing a conductive carbon mixture for manufacturing an electrode of an electricity storage device comprising: an oxidation step of oxidizing a carbon raw material having conductivity to obtain an oxidized carbon and a mixing step of dry mixing the oxidized carbon and a different conductive carbon that is different from the oxidized carbon and covering a surface of the different conductive carbon with the oxidized carbon to obtain a conductive carbon mixture, wherein the dry mixing in the mixing step is conducted until the $R_{2D/D}$ in a Raman spectrum of the obtained conductive carbon mixture is 55% or less of the $R_{2D/D}$ in a Raman spectrum of the different conductive carbon. In this conductive carbon mixture, it is preferable that at least a part of the oxidized carbon has a paste-like state.

Figure 1:
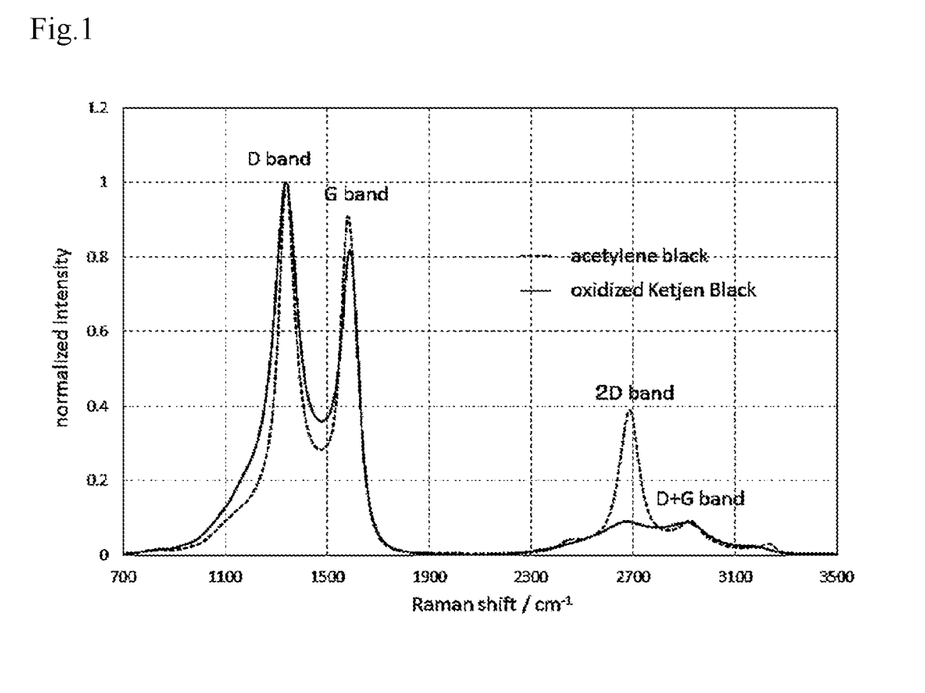
FIG. 1 is a diagram comparing the Raman spectra of an oxidized Ketjen Black and acetylene black.

FIG. 1 shows the results of Raman spectra measurement using a laser Raman spectrophotometer (excitation light: KTP/532 laser: wavelength: 532 nm) of an oxidized Ketjen Black as an oxidized carbon, which is obtained by applying a strong oxidizing treatment to Ketjen Black, and acetylene black as a different conductive carbon which is different from the oxidized carbon. As shown in FIG. 1, a Raman band observed at a wavenumber around 2670 $cm^{-1}$ is the 2D band, and a Raman band observed at a wavenumber from 1300 to 1350 $cm^{-1}$ is the D band. The G band is a Raman band derived from ideal graphite, and the D+G band is a bonding mode of D and G As can be seen from FIG. 1, when the Raman spectra obtained for the oxidized Ketjen Black and the acetylene black are normalized by the peak intensity of the D band, they are greatly different in the peak intensity of the 2D band.

Figure 2:
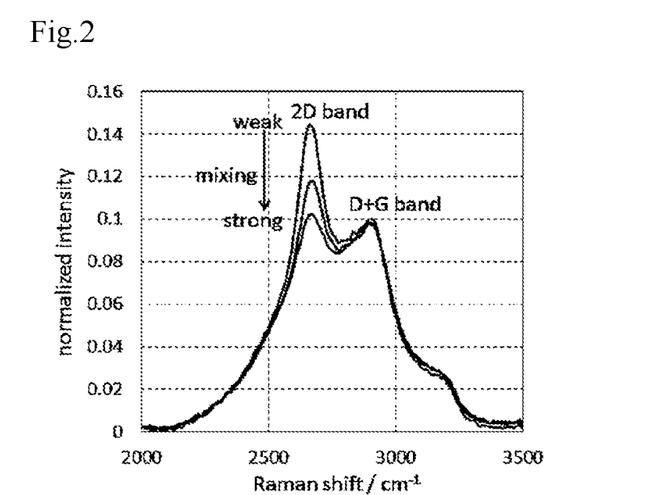
FIG. 2 is a diagram showing the effect of the mixing intensity in a Raman spectrum of a conductive carbon mixture obtained by dry mixing an oxidized Ketjen Black and acetylene black.

When the oxidized Ketjen Black and the acetylene black are introduced into a ball mill and dry mixing is conducted, at least a part of the oxidized Ketjen Black is deformed into a paste-like state during the dry mixing process, and this oxidized Ketjen Black obtained covers a surface of the acetylene black. The Raman spectrum of the conductive carbon mixture obtained by the dry mixing is shown in FIG. 2. The Raman spectrum of FIG. 2 is also normalized by the peak intensity of the D band. As can be seen from FIG. 2, the higher the mixing intensity is by increasing the frequency of the ball mill or by prolonging the mixing time, etc., the lower the peak intensity of the 2D band becomes. This is considered to correspond to the fact that as the mixing intensity is increased, the deformation of the oxidized Ketjen Black into a paste-like state progresses, and the surface of the acetylene black is further covered with the oxidized Ketjen Black having a paste-like state which has been progressed. Also, as can be seen from FIG. 2, the intensity of the adjacent D+G band or the like is hardly affected by the mixing intensity. Therefore, the value of $R_{2D/D}$ in the Raman spectrum of the conductive carbon mixture is a value reflecting the covering condition of the surface of the acetylene black by the oxidized Ketjen Black. It should be noted that even if the mixing intensity is increased by using a mixing apparatus different from a ball mill, the same reduction in the peak intensity of the 2D band as shown in FIG. 2 is observed, and even if the mixing intensity is increased by selecting a carbon raw material other than Ketjen Black to obtain an oxidized carbon and selecting a conductive carbon other than acetylene black as a different conductive carbon that is different from the oxidized carbon, the same reduction in the peak intensity of the 2D band as shown in FIG. 2 is observed.

It has been found that if the measured $R_{2D/D}$ in the Raman spectrum of the conductive carbon mixture obtained by dry mixing. i.e., the conductive carbon mixture wherein the oxidized carbon covers the surface of the different conductive carbon, is in the range of 55% or less, preferably 20 to 55%, and particularly preferably 20 to 35% of the $R_{2D/D}$ in the Raman spectrum of the different conductive carbon, the cycle life of an electrical storage device is significantly improved.

Preferably, the oxidized carbon in the conductive carbon mixture has a hydrophilic part, and the content amount of the hydrophilic part is 10% by mass or more of the total oxidized carbon Here, the "hydrophilic part" of carbon has the following meaning, 0.1 g of carbon is added to 20 mL of an aqueous ammonia solution with pH 11, ultrasonic irradiation is conducted for 1 minute, and the resulting solution is left to stand for 5 hours to precipitate a solid phase part. The part that is not precipitated but dispersed in the aqueous ammonia solution with pH 11 is the "hydrophilic part". Further, the content amount of the hydrophilic part against the whole carbon is determined by the following method, after the solid phase part is precipitated, the supernatant liquid is removed, the remaining part is dried, and the weight of a solid object obtained after drying is measured. The weight calculated by subtracting the weight of the solid object after drying from the weight 0.1 g of the initial carbon (0.1 g) is the weight of the "hydrophilic part" which is dispersed in the aqueous ammonia solution with pH 11. The weight ratio of the weight of the "hydrophilic part" against the weight of the initial carbon (0.1 g) is the contained amount of the "hydrophilic part" in the carbon.

The proportion of the hydrophilic part in conductive carbon such as carbon black, natural graphite and carbon nanotube, which is used as a conductive agent in an electrode of a conventional electric storage device, is 5% by mass or less of the whole carbon. However, when a carbon raw material is subjected to oxidizing treatment, a particle of the carbon is oxidized from the surface thereof, a hydroxy group, a carboxy group and an ether bond are introduced into the carbon, and a conjugated double bond of the carbon is oxidized to form a carbon single bond, a carbon-carbon bond is partially severed, and the hydrophilic part is formed on the surface of the particle. Then, as the intensity of the oxidizing treatment is increased, the proportion of the hydrophilic part in the carbon particle is increased and the hydrophilic part accounts for 10% by mass or more of the whole carbon. Such oxidized carbon is preferably compressed under pressure in a unified manner to easily spread into a paste-like state, and is easily densified.

The conductive carbon mixture of the present invention is used in a mixed form with an electrode active material for the manufacture of an electrode of an electricity storage device. An electrode material in the form of a slurry obtained by mixing the conductive carbon mixture, an electrode active material, a binder and a solvent is preferable. In the process of obtaining the electrode material, the deformation of the oxidized carbon into a paste-like state progresses to cover also the surface of the electrode active material. Further, in the process of forming an electrode by forming an active material layer with this electrode material on a current collector and applying pressure to the active material layer, the deformation of the oxidized carbon into a paste-like state further progresses by the pressure, the covering of the surface of the electrode active material further progresses, and the conductive carbon mixture is densified. The conductive carbon mixture of the present invention wherein the $R_{2D/D}$, in the Raman spectrum is in the range of 55% or less, preferably 20 to 55%, and particularly preferably 20 to 35% of the $R_{2D/D}$ in the Raman spectrum of the different conductive carbon prolongs the cycle life of an electrical storage device equipped with the obtained electrode because it becomes densified while covering the surface of the electrode active material particularly well in the course of producing the electrode material and the electrode. Therefore, the present invention also relates to an electrode for an electricity storage device having an active material layer comprising: an electrode active material; and the conductive carbon mixture of the present invention, wherein the oxidized carbon covers a surface of the electrode active material. The present invention also relates to a method of manufacturing an electrode for an electricity storage device, comprising: an electrode material preparation step of mixing the conductive carbon mixture obtained by the abovementioned method for producing a conductive carbon mixture, an electrode active material, a binder and a solvent to obtain an electrode material in a slurry form: an active material layer forming step of forming an active material layer by applying the electrode material on a current collector; and an electrode forming step of forming an electrode by applying pressure to the active material layer, wherein a surface of the electrode active material is covered with the oxidized carbon through the electrode material preparation step and the electrode forming step. The present invention further relates to an electricity storage device comprising the electrode.

In the active material layer of the electrode, the ratio between the electrode active material and the conductive carbon mixture is not strictly limited, but since the conductive carbon mixture covers the surface of the electrode active material particularly well to impart conductivity to the active material layer and the conductive carbon mixture becomes dense, the amount of the electrode active material in the active material layer can be increased Increasing the amount of electrode active material leads to an increase in the energy density of an electricity storage device. The ratio of the electrode active material to the conductive carbon mixture is preferably in the range of 95:5 to 99.5:0.5 by mass, and particularly preferably in the range of 97:3 to 99.5:0.5.

When the proportion of the conductive carbon mixture is less than the above range, the conductivity of the active material layer is insufficient, and the cycle property tends to be lowered because the coverage of the active material by the conductive carbon mixture is lowered.

ADVANTAGEOUS EFFECTS OF THE INVENTION

The conductive carbon mixture of the present invention comprising: an oxidized carbon having conductivity, and a different conductive carbon that is different from the oxidized carbon, the oxidized carbon covering a surface of the different conductive carbon, wherein the $R_{2D/D}$ in the Raman spectrum is 55% or less of the $R_{2D/D}$ in the Raman spectrum of the different conductive carbon, becomes dense while covering the surface of an electrode active material particularly well in the process of manufacturing an electrode material and an electrode, so that the cycle life of an electricity storage device having the electrode obtained prolongs.

DETAILED DESCRIPTION OF THE INVENTION (1) Conductive Carbon Mixture

A conductive carbon mixture for manufacturing an electrode of an electricity storage device of the present invention comprises an oxidized carbon having conductivity and a different conductive carbon that is different from the oxidized carbon, wherein the oxidized carbon covers a surface of the different conductive carbon Preferably, at least a part of the oxidized carbon has a paste-like state. The $R_{2D/D}$ in a Raman spectrum of this conductive carbon mixture is in the range of 55% or less, preferably 20 to 55%, and particularly preferably 20 to 35% of the $R_{2D/D}$ in a Raman spectrum of the different conductive carbon.

The oxidized carbon, wherein at least a part of the carbon is deformed into a paste-like state in the process of mixing with the different conductive carbon, can be obtained by applying a relatively strong oxidizing treatment to a conductive carbon raw material. The carbon raw material to be used is not particularly limited, but in terms of the easiness of oxidation, carbon having an inner vacancy such as porous carbon powder. Ketjen Black, furnace black having an inner vacancy, carbon nanofiber and carbon nanotube is preferred, and carbon having an inner vacancy with a specific surface area measured by the BET method of 300 $m^2/g$ or more is preferred. In particular, spherical particles such as Ketjen Black and furnace black having an inner vacancy are preferable.

For the oxidizing treatment of the carbon raw material, a known oxidizing method can be used without particular limitation. For example, the oxidized carbon can be obtained by treating the carbon raw material in a solution of acid or hydrogen peroxide. Examples of the acid include nitric acid, a mixture of nitric acid and sulfuric acid and an aqueous hypochlorous acid solution. Further, by heating the carbon raw material in an oxygen-containing atmosphere, water vapor or carbon dioxide, the oxidized carbon can be obtained. Moreover, the carbon raw material is mixed with an alkali metal hydroxide, heated in an oxygen-containing atmosphere, and the alkali metal is removed by washing with water or the like to obtain the oxidized carbon. Likewise, the oxidized carbon can be obtained by plasma treatment, ultraviolet irradiation, corona discharge treatment and glow discharge treatment in an oxygen-containing atmosphere, treatment with ozone water or ozone gas, or oxygen bubbling treatment of the carbon raw material.

When the carbon raw material, preferably the carbon raw material having an inner vacancy, is subjected to the oxidizing treatment, a particle of the carbon is oxidized from the surface thereof, a hydroxy group, a carboxy group and an ether bond are introduced into the carbon, and a conjugated double bond of the carbon is oxidized to form a carbon single bond, a carbon-carbon bond is partially severed, and a hydrophilic part is formed on the surface of the particle. The oxidized carbon having such a hydrophilic part is apt to adhere to the surface of the different conductive carbon and effectively suppresses aggregation of the different conductive carbon. When the strength of the oxidizing treatment is increased, the proportion of the hydrophilic part in the carbon particle increases, and an oxidized carbon having at least a part deformed into a paste-like state in the process of mixing with the different conductive carbon is obtained. The content amount of the hydrophilic part in the oxidized carbon is preferably 10% by mass or more of the whole oxidized carbon. When such oxidized carbon is subjected to pressure, it is preferably compressed in a unified manner to easily spread into a paste-like state, and is easily densified. It is particularly preferable that the content amount of the hydrophilic part is 12 to 30% by mass of the whole.

The oxidized carbon with a hydrophilic part that is at least 10% by mass of the whole can be suitably obtained with a manufacturing method including:
(a) a step of treating a carbon raw material having an inner vacancy with an acid:
(b) a step of mixing the product after the acid treatment and a transition metal compound:
(c) a step of pulverizing the resulting mixture to produce a mechanochemical reaction:
(d) a step of heating the product after the mechanochemical reaction in a non-oxidizing atmosphere; and
(e) a step of removing the transition metal compound and/or the reaction product thereof from the product after heating.

In the step (a), a carbon raw material having an inner vacancy, preferably Ketjen Black, is immersed in an acid and left to stand. Ultrasonic waves may be irradiated at the time of this immersion. As the acid, an acid commonly used for the oxidizing treatment of carbon such as nitric acid, a mixture of nitric acid and sulfuric acid and an aqueous hypochlorous acid solution can be used. The immersion time is not strictly limited depending on the concentration of the acid and the amount of carbon material to be treated, but is generally in the range of 5 minutes to 5 hours. The carbon after the acid treatment is sufficiently washed with water and dried, and then mixed with a transition metal compound in the step (b).

As the transition metal compound to be added to the carbon raw material in the step (b), inorganic metal salts such as halides, nitrates, sulfates and carbonates of a transition metal, organic metal salts such as formates, acetates, oxalates, methoxides, ethoxides and isopropoxides of a transition metal, or mixtures thereof can be used. These compounds may be used alone or in combination of two or more. Compounds having different transition metals can be mixed and used in a predetermined amount. Further, a compound other than a transition metal compound, for example, an alkali metal compound can be added together as long as it does not adversely affect the reaction. Since the oxidized carbon is mixed with an electrode active material in the production of an electrode of an electricity storage device, it is preferable that a compound of elements constituting the electrode active material is added to the carbon raw material so as to prevent elements that can become impurities from being mixed into the electrode active material.

In step (c), the mixture obtained in step (b) is pulverized to cause a mechanochemical reaction. The transition metal compound acts to promote the oxidation of the carbon raw material by the mechanochemical reaction, and the oxidation of the carbon raw material proceeds rapidly in this process. Examples of a pulverizer for this reaction include a mashing machine, a stone grinder, a ball mill, a bead mill, a rod mill, a roller null, a stirring null, a planetary mill, a vibration mill, a hybridizer, mechanochemical compositor and a jet mill. The pulverization time is not strictly limited depending on the pulverizer used and the amount of carbon to be processed, but generally ranges from 5 minutes to 3 hours. The step (d) is performed in a non-oxidizing atmosphere such as a nitrogen atmosphere or an argon atmosphere. The heating temperature and heating time are suitably selected according to the transition metal compound used. In the subsequent step (e), the transition metal compound and/or the reaction product thereof are removed from the heated product by a means such as dissolving with an acid, and then the remaining product is sufficiently washed and dried. Through these steps, it is possible to obtain the oxidized carbon having a hydrophilic part of 10% by mass or more of the whole, preferably not less than 12% by mass and not more than 30% by mass of the whole.

The conductive carbon mixture of the present invention can be obtained by dry mixing the obtained oxidized carbon with a different conductive carbon that is different from this oxidized carbon.

As the different conductive carbon to be mixed with the oxidized carbon, a conventional conductive carbon used for an electrode of an electricity storage device can be used without limitations, including carbon black such as Ketjen Black, acetylene black, channel black, furnace black and thermal black, fullerene, carbon nanotube, carbon nanofiber, amorphous carbon, carbon fiber, natural graphite, artificial graphite, graphitized Ketjen Black, mesoporous carbon and gas-phase carbon fiber. These may be used alone or in combination of two or more. It is preferable to use a conductive carbon having a conductivity higher than that of the oxidized carbon having at least a part deformed into a paste-like state, and especially, acetylene black is preferably used.

The ratio of the oxidized carbon to the different conductive carbon is preferably in the range of 3:1 to 1:3 by mass, more preferably in the range of 2.5:1.5 to 1.5:2.5 by mass. For the dry mixing, a mashing machine, a stone grinder, a ball mill, a bead mill, a rod mill, a roller mill, a stirring mill, a planetary mill, a vibration mill, a hybridizer, a mechanochemical compositor, and a jet mill can be used. The dry mixing time depends on the total amount of the oxidized carbon and the different conductive carbon to be mixed as well as the mixing apparatus used, but is generally between 10 minutes and 1 hour.

Since at least a part of the oxidized carbon is deformed into a paste-like state in the dry mixing process to cover the surface of the different conductive carbon, aggregation of the different conductive carbon can be suppressed. When the Raman spectrum is measured for the conductive carbon mixture after dry mixing, as shown in FIG. 2, the higher the mixing intensity in the dry mixing is, that is to say, the more the surface of the different conductive carbon is covered with the oxidized carbon having at least part deformed into a paste-like state, the lower the peak intensity of the 2D band becomes. The $R_{2D/D}$ in the Raman spectrum of the conductive carbon mixture of the present invention is in the range of 55% or less, preferably 20 to 55%, and particularly preferably 20 to 35% of the $R_{2D/D}$ in the Raman spectrum of the different conductive carbon, and a dry mixing condition for adjusting to this range can be determined by a simple preliminary experiment. Since the conductive carbon mixture of the present invention becomes dense while covering the surface of an electrode active material particularly well in the process of manufacturing an electrode material and an electrode as described below, the cycle life of an electricity storage device provided with the obtained electrode is prolonged. When the dry mixing intensity of the oxidized carbon and the different conductive carbon is increased so that the $R_{2D/D}$ in the Raman spectrum of the conductive carbon mixture becomes less than 20% of the $R_{2D/D}$ in the Raman spectrum of the different conductive carbon, the cycle life of an electricity storage device is prolonged in comparison with the case when an insufficient dry mixing intensity wherein the $R_{2D/D}$ in the Raman spectrum of the conductive carbon mixture is more than 55% of the $R_{2D/D}$ in the Raman spectrum of the different conductive carbon is applied, but the cycle life of an electricity storage device tends to be shortened in comparison with the case when a suitable dry mixing intensity wherein the $R_{2D/D}$ in the Raman spectrum of the conductive carbon mixture is within the range of 20 to 55% of the $R_{2D/D}$ in the Raman spectrum of the different conductive carbon. At this time, the reason why the cycle life tends to be shortened is not clearly understood.

(2) Electrode

For manufacturing an electrode of an electricity storage device such as a secondary battery, an electric double layer capacitor, a redox capacitor and a hybrid capacitor, the conductive carbon mixture of the present invention is used in the form of mixture with an electrode active material that expresses a capacity by a Faraday reaction with transfer of electrons with ions in the electrolyte of the electricity storage device or a non-Faraday reaction without transfer of electrons with ions in the electrolyte of the electricity storage device.

As the electrode active material used in combination with the conductive carbon mixture of the present invention, a conventional active material used as a positive electrode active material or a negative electrode active material in an electricity storage device can be used without particular limitation. This active material may be a single compound or a mixture of two or more compounds.

Examples of a positive electrode active material of a secondary battery include, first of all, layered rock salt type $LiMO_2$, layered $Li_2MnO_3$—$LiMO_2$ solid solution, and spinel type $LiM_2O_4$ (M in the formula means Mn, Fe, Co, Ni, or a combination thereof). Specific examples thereof include $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{1/2}Co_{1/3}Mn_{1/3}O_2$, $LiMn_2O_4$, and $LiMn_{3/2}Ni_{1/2}O_4$. Other examples include sulfur and a sulfide such as $Li_2S$, $TiS_2$, $MoS_2$, $FeS_2$. $VS_2$, $Cr_{1/2}V_{1/2}S_2$, a selenide such as $NbSe_3$, $VSe_2$ and $NbSe_3$, an oxide such as $Cr_2O_5$, $Cr_3O_8$, $VO_2$, $V_3O_8$, $V_2O_5$ and $V_6O_{13}$, and a compound oxide such as $LiNi_{0.8}Co_{0.15}Al_{0.05}O_2$, $LiVOPO_4$, $LiV_3O_5$, $LiV_3O_8$, $MoV_2O_8$, $Li_2FeSiO_4$, $Li_2MnSiO_4$, $LiFePO_4$, $LiFe_{1/2}Mn_{1/2}PO_4$, $LiMnPO_4$, and $Li_3V_2(PO_4)_3$.

Examples of a negative electrode active materials of a secondary battery include oxides such as $Fe_2O_3$, $MnO$, $MnO_2$, $Mn_2O_3$, $Mn_3O_4$, $CoO$, $Co_3O_4$, $NiO$, $Ni_2O_3$, $TiO$, $TiO_2$, $SnO$, $SnO_2$, $SiO_2$, $RuO_2$, $WO$, $WO_2$ and $ZnO$, metals such as Sn, Si, Al, and Zn, composite oxides such as $LiVO_2$, $Li_3VO_4$ and $Li_4Ti_5O_{12}$, and nitrides such as $Li_{2.6}Co_{0.4}N$, $Ge_3N_4$, $Zn_3N_2$ and $Cu_3N$.

Examples of an active material in a polarizable electrode of an electric double layer capacitor include carbon materials having a large specific surface area such as an activated carbon, a carbon nanofiber, a carbon nanotube, a phenolic resin carbide, a polyvinylidene chloride carbide, and a microcrystalline carbon. In a hybrid capacitor, the positive electrode active material exemplified for a secondary battery can be used for a positive electrode, and in this case, a negative electrode is composed of a polarizable electrode using activated carbon or the like. Also, the negative electrode active material exemplified for a secondary battery can be used for a negative electrode, and in this case, a positive electrode is composed of a polarizable electrode using activated carbon or the like. Examples of a positive electrode active material of a redox capacitor include metal oxides such as $RuO_2$, $MnO_2$ and $NiO$, and a negative electrode is composed of an active material such as $RuO_2$ and a polarizable material such as active carbon.

The particle shape and particle size of an electrode active material are not limited, but the average particle size of an active material is preferably larger than 2 µm and equal to or smaller than 25 µm. This active material having a relatively large average particle size not only improves the electrode density itself, but also promotes the further deformation to a paste-like state and the densification of the oxidized carbon having at least a part deformed into a paste-like state in the conductive carbon mixture by its pressing force in the process of manufacturing an electrode material and an electrode. Further, the active material can also be composed of fine particles having an average particle size of 0.01 to 2 µm and coarse particles having an average particle size of 25 µm or less and larger than 2 µm which can operate as an active material at the same electrode as the fine particles. Although it is said that particles having a small particle size tend to aggregate, the oxidized carbon having at least a part deformed into a paste-like state in the conductive carbon mixture adheres to and covers not only the surface of the coarse particles but also the surface of the fine particles, so that the agglomeration of the active material can be suppressed and the mixing state of the active material and the conductive carbon mixture can be made uniform.

The mass ratio of an electrode active material to a conductive carbon mixture to be mixed is not particularly limited, but in order to obtain an electricity storage device having a high energy density, the mass ratio is preferably in the range of 90:10 to 99.5:0.5. The conductive carbon mixture of the present invention wherein the $R_{2D/D}$ in the Raman spectrum is in the range of 55% or less, preferably 20 to 55%, and particularly preferably 20 to 35% of the $R_{2D/D}$ in the Raman spectrum of the different conductive carbon can further increase the electrode active material because it becomes dense while covering the surface of the electrode active material particularly well in the course of manufacturing an electrode material and an electrode, and the mass ratio of the electrode active material to the conductive carbon mixture is preferably in the range of 95:5 to 99.5:0.5, particularly preferably in the range of 97:3 to 99.5:0.5. When the proportion of the conductive carbon mixture is less than the above range, the conductivity of the active material layer is insufficient, and the cycle property tends to be lowered because the coverage of the active material by the conductive carbon mixture is lowered.

By mixing the conductive carbon mixture of the present invention and the electrode active material together with a binder and a solvent, it is possible to obtain an electrode material in the form of a slurry that is used for manufacturing an electrode.

As the binder, heretofore known binders such as polytetrafluoroethylene, polyvinylidene fluoride, tetrafluoroethylene-hexafluoropropylene copolymer, polyvinylfluoride and carboxymethylcellulose are used. The content amount of the binder is preferably 1 to 30% by mass of the total amount of the electrode material. When the content is 1% by mass or less, the strength of the active material layer is not sufficient, and when the content is 30% by mass or more, disadvantages arise such as lowered discharge capacity of the electrode or excessive internal resistance. As the solvent, a solvent that does not adversely affect other components in the electrode material, such as N-methylpyrrolidone, dimethylformamide, tetrahydrofuran, isopropyl alcohol and water, can be used without particular limitation. The binder can be used in a form dissolved in the solvent. The amount of solvent used is not particularly limited as long as it does not interfere with the formation of the active material layer of the electrode as described below.

The electrode material in the form of a slurry can be produced by dry mixing the conductive carbon mixture of the present invention and the electrode active material, and then mixing the resulting mixture together with the binder and the solvent. In the dry mixing process of the conductive carbon mixture and the electrode active material, the oxidized carbon having at least a part deformed into a paste-like state in the conductive carbon mixture further spreads into a paste-like state to cover the surface of the electrode active material. For the dry mixing, a mashing machine, a stone grinder, a ball mill, a bead mill, a rod mill, a roller mill, a stirring mill, a planetary mill, a vibration mill, a hybridizer, a mechanochemical compositor, and a jet mill can be used. The dry mixing time depends on the total amount of the conductive carbon mixture and the electrode active material to be mixed as well as the mixing apparatus used, but is generally between 10 minutes and 1 hour. The mixing method in the subsequent wet mixing with the binder and the solvent is not particularly limited and can be carried out by hand mixing using a mortar or can be carried out by using a heretofore known mixing apparatus such as a stirrer or a homogenizer. The time for wet mixing also depends on the amount of material being mixed and the mixing apparatus used, but is generally between 10 minutes and 1 hour.

Since the conductive carbon mixture of the present invention is easy to blend with the binder and the solvent, instead of the above method, the method of wet mixing all the conductive carbon mixture, the electrode active material, the binder and the solvent can be adopted, a method of wet mixing the conductive carbon mixture, the binder and the solvent and further adding and wet mixing the electrode active material can be adopted, or a method of wet mixing the conductive carbon mixture, the electrode active material and the solvent and further adding and wet mixing the binder can be adopted. Also in the wet mixing, the mixing method is not particularly limited, and the mixing time is appropriately selected according to the mixing apparatus and the mixing amount. Although fine carbon particles are said to be difficult to blend with a binder and a solvent, electrode materials wherein each component is uniformly mixed can be easily obtained by using the conductive carbon mixture regardless of the mixing method.

Then, an active material layer is formed by applying the electrode material in the form of a slurry onto a current collector for forming a positive electrode or a negative electrode of an electricity storage device, this active material layer is dried as necessary, and then pressure is applied to the active material layer by a rolling process to obtain an electrode. The obtained electrode material can be formed into a predetermined shape, pressed onto the current collector, and then rolled.

A conductive material such as platinum, gold, nickel, aluminum, titanium, steel, carbon, or the like can be used as the current collector for the electrode of an electricity storage device. The current collector may have any shape such as a film, a foil, a plate, a network, an expanded metal, or a cylinder. When the active material layer is dried, the solvent can be removed by reducing pressure or adding heat as necessary. The pressure applied to the active material layer by the rolling process is generally in the range of 50000 to 1000000 $N/cm^2$, preferably 100000 to 500000 $N/cm^2$. The temperature of the rolling process is not particularly limited, and the process may be carried out at room temperature or under heating conditions.

When pressure is applied to the active material layer on the current collector, the oxidized carbon having at least a part deformed into a paste-like state in the conductive carbon mixture further spreads in a paste-like state, becomes dense while covering the surface of the active material particles, the active material particles approach each other, and accordingly, the oxidized carbon having a paste-like state is pushed out not only to gaps that are formed between adjacent active material particles but also to the inside of the pores that exist on the surface of the active material particles while covering the surface of the active material particles and fills up densely. Therefore, the amount of active material per unit volume in the electrode increases, and the electrode density increases. In addition, the densely filled conductive carbon mixture has sufficient conductivity to function as a conductive agent and suppresses dissolution of the electrode active material into the electrolytic solution.

(3) Electricity Storage Device

The electrode of the present invention is used for an electrode of an electricity storage devices such as a secondary battery, an electric double layer capacitor, a redox capacitor and a hybrid capacitor. The electrical storage device includes a pair of electrodes (positive and negative electrodes) and an electrolyte disposed therebetween as essential elements, wherein at least one of a positive electrode and a negative electrode is an electrode of the present invention.

In the electricity storage device, the electrolyte disposed between the positive electrode and the negative electrode can be an electrolyte held in a separator, a solid electrolyte or a gelatinous electrolyte, and an electrolyte used in a conventional electricity storage device can be used without particular limitation. Typical electrolytes are illustrated below. For a lithium ion secondary battery, an electrolyte obtained by dissolving a lithium salt such as $LiPF_6$, $LiBF_4$, $LiCF_3SO_3$ and $LiN(CF_3SO_2)_2$ in a solvent such as ethylene carbonate, propylene carbonate, butylene carbonate and dimethyl carbonate is used in a state wherein the electrolyte is held in a separator such as a polyolefin fibrous nonwoven fabric and a glass fibrous nonwoven fabric. In addition, an inorganic solid electrolyte such as $Li_5La_3Nb_2O_{12}$, $Li_{1.5}Al_{0.5}Ti_{1.5}(PO_4)$, $Li_7La_3Zr_2O_{12}$ and $Li_7P_3S_{11}$, an organic solid electrolyte composed of a composite of a lithium salt and a polymer compound such as polyethylene oxide, polymethacrylate and polyacrylate, and a gelatinous electrolyte wherein an electrolyte is absorbed by polyvinylidene fluoride, polyacrylonitrile and the like are also used. For an electric double layer capacitor and a redox capacitor, an electrolyte wherein a quaternary ammonium salt such as $(C_2H_5)_4NBF_4$ is dissolved in a solvent such as acrylonitrile and propylene carbonate is used. For a hybrid capacitor, an electrolyte wherein a lithium salt is dissolved in propylene carbonate or the like, or an electrolyte wherein a quaternary ammonium salt is dissolved in propylene carbonate or the like is used.

However, when the solid electrolyte or the gelatinous electrolyte is used as the electrolyte between the positive electrode and the negative electrode, a solid electrolyte is added to each of the above-mentioned components in the preparation step of the electrode material in order to secure an ion conduction path in the active material layer.

EXAMPLES

The present invention is explained in the following examples, though the present invention is not limited to the following examples.

Example 1

10 g of Ketjen Black (product name: EC 300 J, manufactured by Ketjen Black International, BET specific surface area: 800 m$^2$/g) was added to 300 mL of 60% nitric acid, and the resulting solution was irradiated with ultrasonic waves for 10 minutes, and then filtered to recover Ketjen Black. The collected Ketjen Black was washed with water three times and dried to obtain acid-treated Ketjen Black, 0.5 g of this acid-treated Ketjen Black, 1.98 g of $Fe(CH_3COO)_2$, 0.77 g of $Li(CH_3COO)$, 1.10 g of $C_6H_8O_7 \cdot H_2O$, 1.32 g of $CH_3COOH$, 1.31 g of $H_3PO_4$ and 120 mL of distilled water were mixed, and the resulting mixture was stirred with a stirrer for 1 hour, and then evaporated to dryness at 100 degrees centigrade in air to collect a mixture. The resulting mixture was then introduced into a vibrating ball mill and ground at 20 hz for 10 minutes. The pulverized powder was heated at 700 degrees centigrade in nitrogen for 3 minutes to obtain a composite wherein $LiFePO_4$ was supported on Ketjen Black.

1 g of the obtained composite was added to 100 mL of an aqueous hydrochloric acid solution having a concentration of 30%, and the $LiFePO_4$ in the composite was dissolved while the obtained solution was irradiated with ultrasonic waves for 15 minutes, and the remaining solid was filtered, washed with water, and dried. A portion of the dried solid was heated to 900 degrees centigrade in air by TG analysis and weight loss was measured. $LiFePO_4$-Free oxidized carbon was obtained by repeating the above-described steps of dissolving $LiFePO_4$ with the aqueous hydrochloric acid solution, filtering, washing with water and drying until it was confirmed that the weight loss was 100%, that is, $LiFePO_4$ was not remaining.

Then, 0.1 g of the obtained oxidized carbon was added to 20 mL of an aqueous ammonia solution with pH 11, and ultrasonic irradiation was performed for 1 minute. The resulting solution was left to stand for 5 hours to precipitate the solid phase portion. After the solid phase portion was precipitated, the supernatant liquid was removed, then the remaining portion was dried, and the weight of the dried solid was measured. The weight ratio of the weight of the first oxidized carbon 0.1 g minus the weight of the dried solid to the weight of the first oxidized carbon 0.1 g was taken as the content amount of the "hydrophilic part" in the oxidized carbon. The content amount of the hydrophilic part was 15.2% by mass.

The resulting oxidized carbon and acetylene black ($R_{2D/D}$:0.4) were introduced into a vibrating ball mill at a mass ratio of 1:1, and dry mixing was conducted for 20 minutes at 10 hz to obtain a conductive carbon mixture. The Raman spectrum was measured for this mixture using a laser Raman spectrophotometer (excitation light: KTP/532 laser, wavelength: 532 nm), and the $R_{2D/D}$ values were calculated.

2 parts by mass of the resulting conductive carbon mixture, 2 parts by mass of polyvinylidene fluoride, an appropriate amount of N-methylpyrrolidone, and 96 parts by mass of commercially available $LiNi_{1/3}Mn_{1/3}Co_{1/3}O_2$ particles (average particle size: 5 μm) were wet-mixed to form a slurry, and the resulting slurry was applied on an aluminum foil, dried, and rolled to obtain a positive electrode for a lithium ion secondary battery. Also, a slurry was formed by wet mixing 93 parts by mass of graphite, 1 parts by mass of acetylene black, 6 parts by mass of polyvinylidene fluoride and an appropriate amount of N-methylpyrrolidone, and the resulting slurry was coated on a copper foil, dried, and rolled to obtain a negative electrode for a lithium ion secondary battery. The capacity of the positive electrode and the capacity of the negative electrode were adjusted so that the capacity ratio was 1:1.2. With this positive electrode and this negative electrode, a lithium ion secondary battery was prepared by using a solution obtained by adding 1% by mass of vinylene carbonate to a solution of 1 M $LiPF_6$ in ethylene carbonate/dimethyl carbonate at a ratio of 1:1 as an electrolyte. With respect to the obtained battery, charging and discharging were repeated in the range of 4.2 to 3.0 V at 25 degrees centigrade and at charging and discharging rates of 1 C, and the capacity retention rate after 200 cycles was obtained.

Example 2

Example 1 was repeated except that the dry mixing condition with the vibrating ball mill for obtaining the conductive carbon mixture in Example 1 was changed from the condition of 20 minutes at 10 hz to the condition of 10 minutes at 20 hz.

Example 3

Example 1 was repeated except that the dry mixing condition by the vibrating ball mill for obtaining the conductive carbon mixture in Example 1 was changed from the condition of 20 minutes at 10 hz to the condition of 20 minutes at 20 hz.

Example 4

Example 1 was repeated except that the dry mixing condition by the vibrating ball mill for obtaining the conductive carbon mixture in Example 1 was changed from the condition of 20 minutes at 10 hz to the condition of 30 minutes at 20 hz.

Example 5

Example 1 was repeated except that the dry mixing condition by the vibrating ball mill for obtaining the conductive carbon mixture in Example 1 was changed from the condition of 20 minutes at 10 hz to the condition of 20 minutes at 30 hz.

Example 6

Example 1 was repeated except that the dry mixing condition by the vibrating ball null for obtaining the conductive carbon mixture in Example 1 was changed from the condition of 20 minutes at 10 hz to the condition of 30 minutes at 30 hz.

COMPARATIVE EXAMPLE

Example 1 was repeated except that the dry mixing condition by the vibrating ball mill for obtaining the conductive carbon mixture in Example 1 was changed from the condition of 20 minutes at 10 hz to the condition of 10 minutes at 10 hz.

Table 1 summarizes the $R_{2D/D}$ calculated from the Raman spectra, the ratios of the $R_{2D/D}$, of the conductive carbon mixture to the $R_{2D/D}$ (0.4) of acetylene black, and the capacity retention rates after 200 cycles for the conductive carbon mixture and lithium ion secondary batteries of Examples 1 to 6 and Comparative Example.

TABLE 1

|  | $R_{2D/D}$ | Ratio (%) | Capacity Retention Rate (%) |
|---|---|---|---|
| Comparative Example | 0.239 | 59.7 | 76.0 |
| Example 1 | 0.214 | 53.6 | 85.2 |
| Example 2 | 0.128 | 32.1 | 91.1 |
| Example 3 | 0.118 | 29.5 | 93.2 |
| Example 4 | 0.111 | 27.7 | 89.0 |
| Example 5 | 0.098 | 24.5 | 88.8 |
| Example 6 | 0.075 | 18.8 | 81.2 |

As can be seen from Table 1, the use of the conductive carbon mixture of Examples 1 to 6 wherein the $R_{2D/D}$ in the Raman spectra is 55% or less of the $R_{2D/D}$ in the Raman spectrum of acetylene black resulted in a high capacity retention rate of the lithium ion secondary battery, thus achieving a longer cycle life of the lithium ion secondary battery.

INDUSTRIAL APPLICABILITY

The use of the conductive carbon mixture of the present invention provides an electricity storage device with excellent cycle life.

What is claimed is:

1. A method of producing a conductive carbon mixture suitable for use as a conductive agent for manufacturing an electrode of an electricity storage device, comprising:
   an oxidation step of oxidizing a carbon raw material having conductivity to obtain an oxidized carbon having conductivity until the oxidized carbon obtained by the oxidizing has a property of changing into a paste-like state when subjected to pressure; and
   a mixing step of dry mixing the oxidized carbon and a different conductive carbon that is different from the oxidized carbon while applying a pressure to change at least a part of the oxidized carbon into a paste-like state and covering a surface of the different conductive carbon with the oxidized carbon to obtain the conductive carbon mixture,
   wherein the dry mixing in the mixing step is conducted so that a ratio of the peak intensity of the 2D band to the peak intensity of the D band in a Raman spectrum of the obtained conductive carbon mixture is in a range of 20 to 55% of a ratio of the peak intensity of the 2D band to the peak intensity of the D band in a Raman spectrum of the different conductive carbon.

2. The method of producing a conductive carbon mixture according to claim 1, wherein in the oxidation step, the oxidized carbon having a hydrophilic part of 10% by mass or more of the whole oxidized carbon is obtained.

3. The method of producing a conductive carbon mixture according to claim 2, wherein the carbon raw material is Ketjen Black and the different conductive carbon is acetylene black.

4. The method of producing a conductive carbon mixture according to claim 2, wherein in the mixing step, the dry mixing is conducted so that the ratio of the peak intensity of the 2D band to the peak intensity of the D band in the Raman spectrum of the obtained conductive carbon mixture is in a range of 20 to 35% of the ratio of the peak intensity of the 2D band to the peak intensity of the D band in the Raman spectrum of the different conductive carbon.

5. The method of producing a conductive carbon mixture according to claim 4, wherein the carbon raw material is Ketjen Black and the different conductive carbon is acetylene black.

6. The method of producing a conductive carbon mixture according to claim 1, wherein the carbon raw material is Ketjen Black and the different conductive carbon is acetylene Black.

7. The method of producing a conductive carbon mixture according to claim 1, wherein in the mixing step, the dry mixing is conducted so that the ratio of the peak intensity of the 2D band to the peak intensity of the D band in the Raman spectrum of the obtained conductive carbon mixture is in a range of 20 to 35% of the ratio of the peak intensity of the 2D band to the peak intensity of the D band in the Raman spectrum of the different conductive carbon.

8. The method of producing a conductive carbon mixture according to claim 7, wherein the carbon raw material is Ketjen Black and the different conductive carbon is acetylene black.

9. A method of manufacturing an electrode for an electricity storage device, comprising:
   an electrode material preparation step of mixing the conductive carbon mixture obtained by the method for producing a conductive carbon mixture according to claim 1, an electrode active material, a binder and a solvent to obtain an electrode material in a slurry form;
   an active material layer forming step of forming an active material layer by applying the electrode material on a current collector; and
   an electrode forming step of forming an electrode by applying pressure to the active material layer,
   wherein a surface of the electrode active material is covered with the oxidized carbon through the electrode material preparation step and the electrode forming step.

10. The method of manufacturing an electrode for an electricity storage device according to claim 9, wherein a ratio of the electrode active material to the conductive carbon mixture is in the range of 97:3 to 99.5:0.5 by mass.

* * * * *